US007531922B1

(12) United States Patent
Olson

(10) Patent No.: US 7,531,922 B1
(45) Date of Patent: May 12, 2009

(54) METHOD AND APPARATUS FOR USING LIGHTING TO PERFORM FACILITY-WIDE POWER FACTOR CORRECTION DIMMING AND REMOTE FUNCTIONS AND TO COMMUNICATE WITH A BUILDING CONTROL SYSTEM OVER A POWER LINE COMMUNICATIONS METHOD(S) WHICH CAN BE PROGRAMMED AFTER MANUFACTURE

(75) Inventor: Erlend Olson, Huntington Beach, CA (US)

(73) Assignee: Zobi Mobile, Newport Beach, CA (US)

( * ) Notice: Subject to any disclaimer, the term of this patent is extended or adjusted under 35 U.S.C. 154(b) by 327 days.

(21) Appl. No.: 11/479,934

(22) Filed: Jun. 30, 2006

Related U.S. Application Data

(60) Provisional application No. 60/696,024, filed on Jun. 30, 2005.

(51) Int. Cl.
*H02J 9/02* (2006.01)

(52) U.S. Cl. ...................................................... 307/157

(58) Field of Classification Search .................. 307/157
See application file for complete search history.

(56) References Cited

U.S. PATENT DOCUMENTS 6,181,086 B1 * 1/2001 Katyl et al. ................. 315/307
6,407,987 B1 * 6/2002 Abraham .................... 370/295

* cited by examiner

*Primary Examiner*—Robert L. Deberadinis
(74) *Attorney, Agent, or Firm*—Fernandez & Associates, LLP

(57) ABSTRACT

Electronic lighting ballast in a facility intentionally presents a non-unity power factor load to an inductive or capacitive power supply, such a capability being used to correct the power factor for a larger facility employing different types of loads. Electronic lighting ballast is also used to intentionally generate specified harmonics of a certain phase and amplitude to a power source, and further, the method, apparatus and system uses such a capability to cancel undesirable harmonics generated by other equipment in a larger facility. A method of employing a communications protocol between an electronic ballast and a facility control or monitoring system, such that the system can communicate with many adjustable ballast's in a facility, and direct the ballast's, collectively or individually, to change their power factor or light output status or harmonic characteristics.

55 Claims, 7 Drawing Sheets

Figure 1 -Syste m Diagram
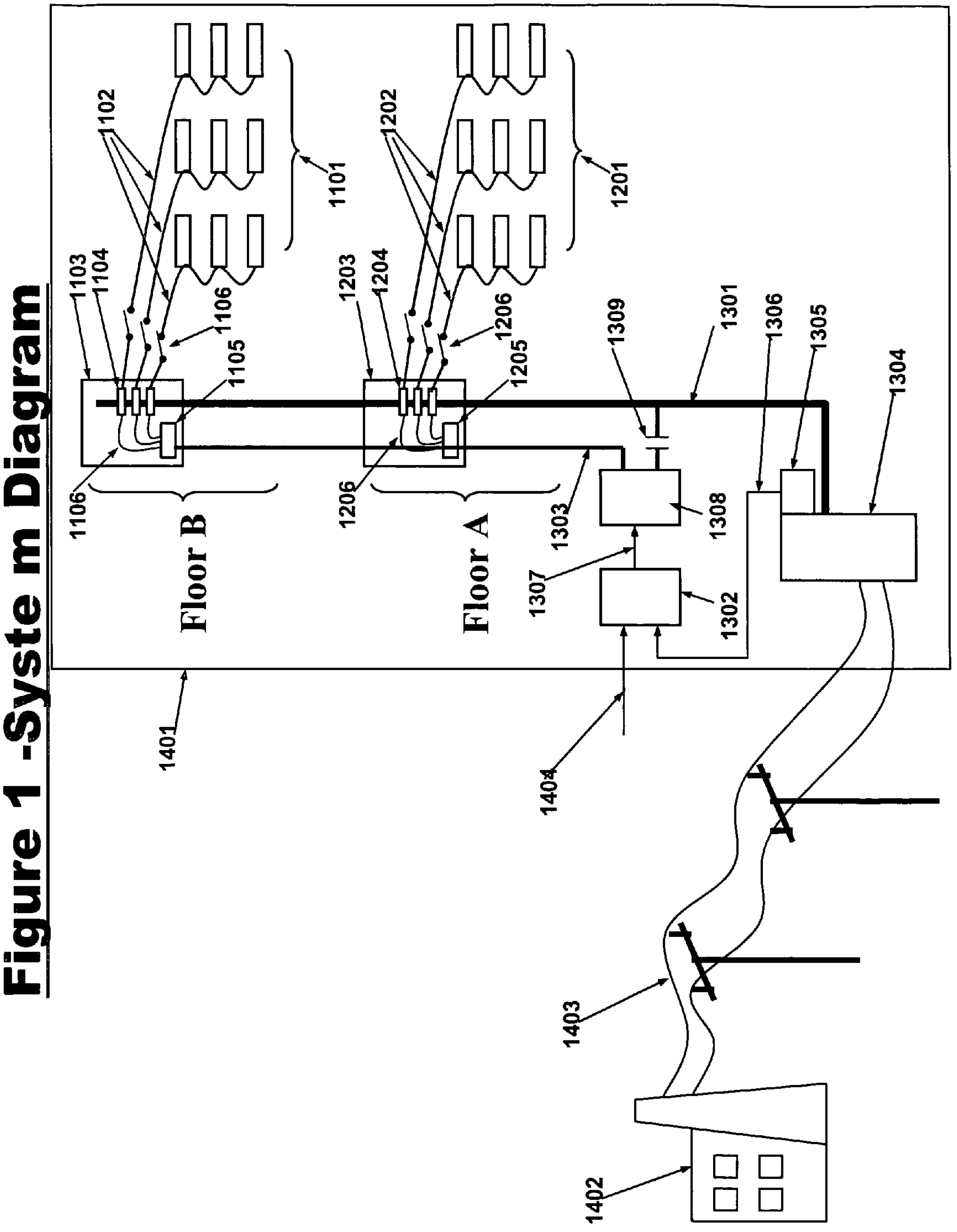

Figure 2 -Ballast Circuit Diagram
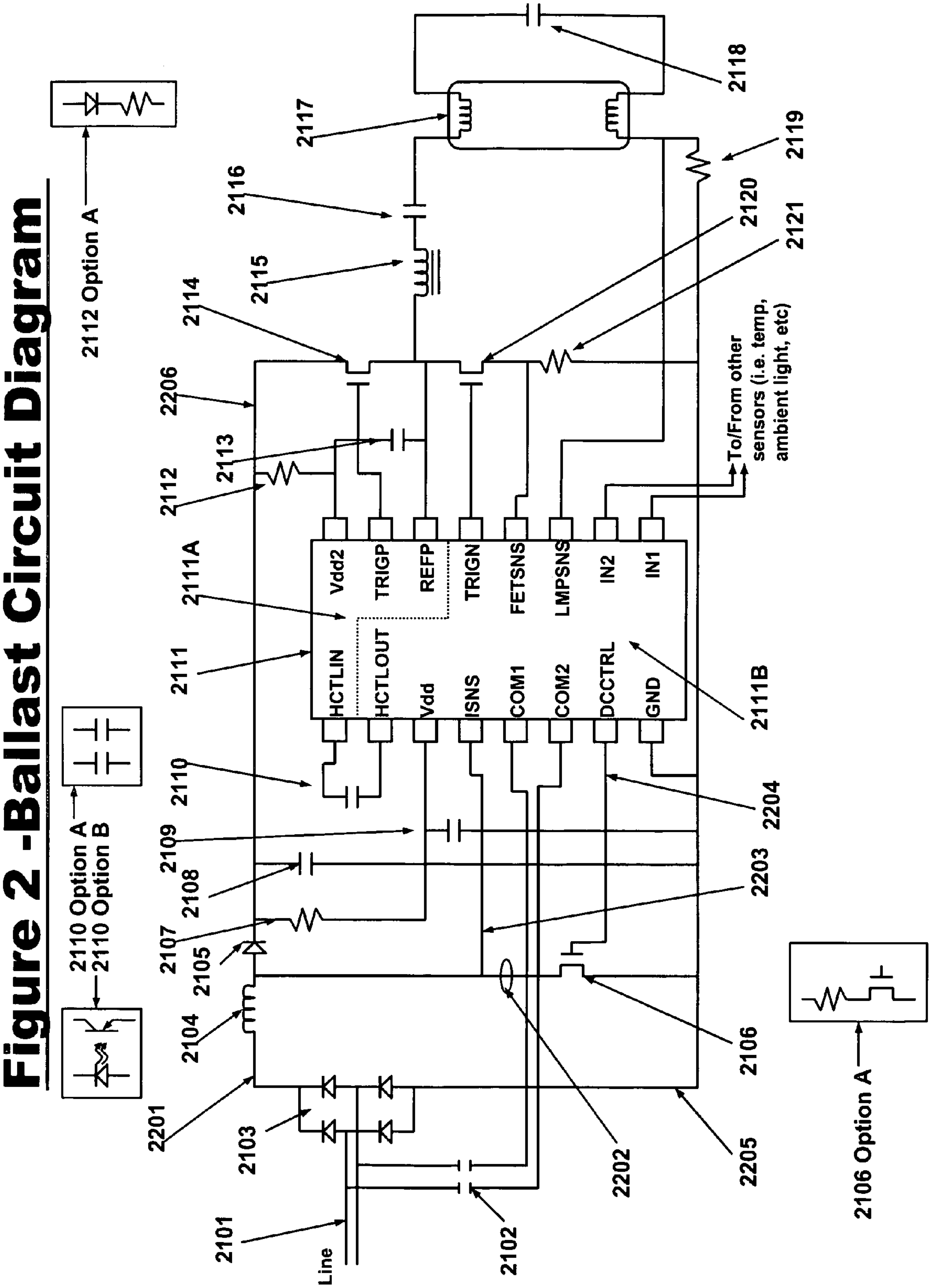

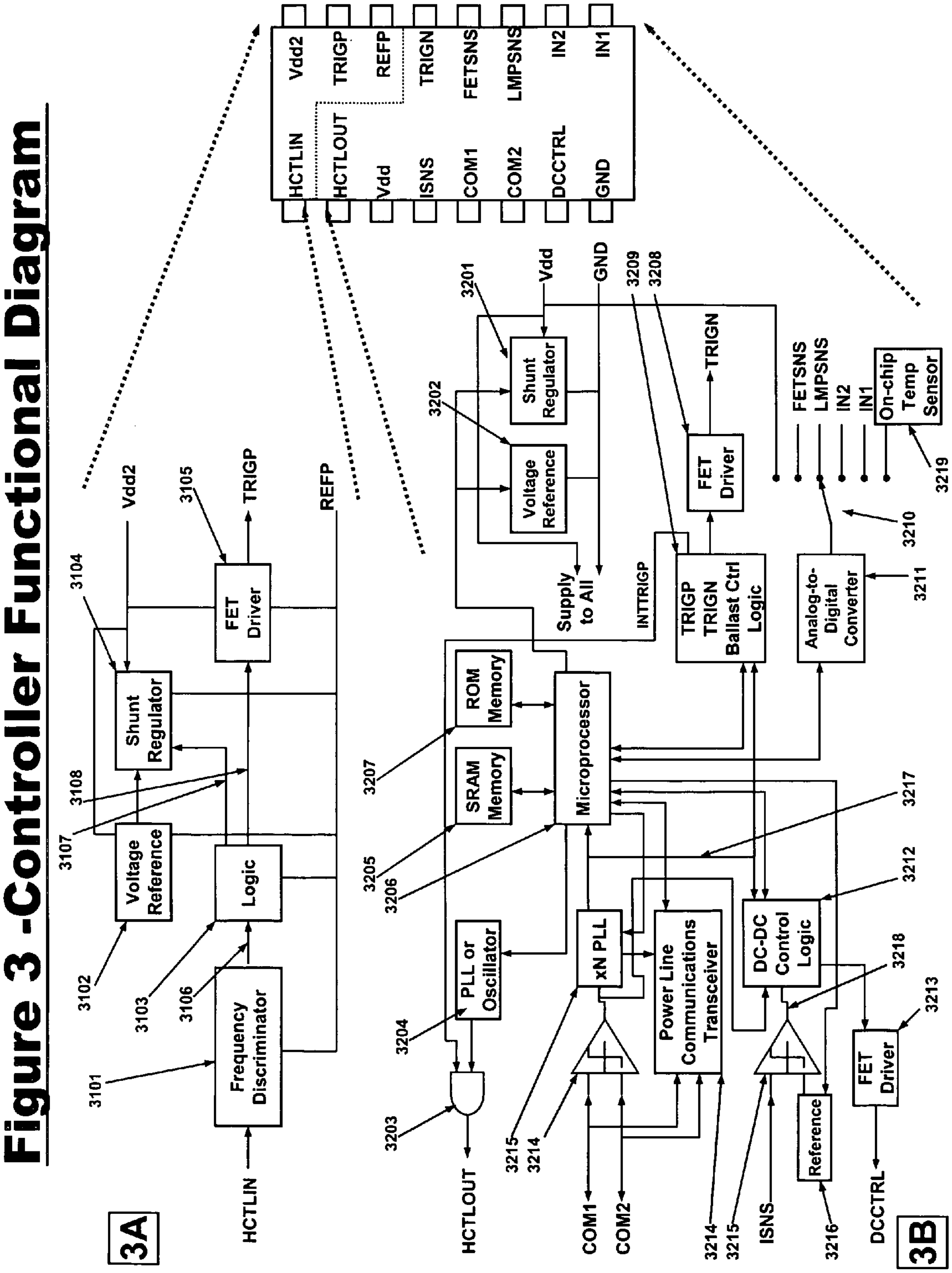
Figure 3 -Controller Functional Diagram
3A
HCTLIN
Frequency Discriminator
Logic
Voltage Reference
Shunt Regulator
FET Driver
Vdd2
TRIGP
REFP
3101
3102
3103
3104
3105
3106
3107
3108
HCTLIN
HCTLOUT
Vdd
ISNS
COM1
COM2
DCCTRL
GND
Vdd2
TRIGP
REFP
TRIGN
FETSNS
LMPSNS
IN2
IN1
3B
HCTLOUT
COM1
COM2
ISNS
DCCTRL
PLL or Oscillator
xN PLL
Power Line Communications Transceiver
DC-DC Control Logic
Reference
FET Driver
SRAM Memory
ROM Memory
Microprocessor
Voltage Reference
Shunt Regulator
Supply to All
INTTRIGP
TRIGP TRIGN Ballast Ctrl Logic
FET Driver
TRIGN
Analog-to-Digital Converter
FETSNS
LMPSNS
IN2
IN1
On-chip Temp Sensor
Vdd
GND
3201
3202
3203
3204
3205
3206
3207
3208
3209
3210
3211
3212
3213
3214
3215
3216
3217
3218
3219

Figure 3C - Power Line Transceiver Functional Diagram
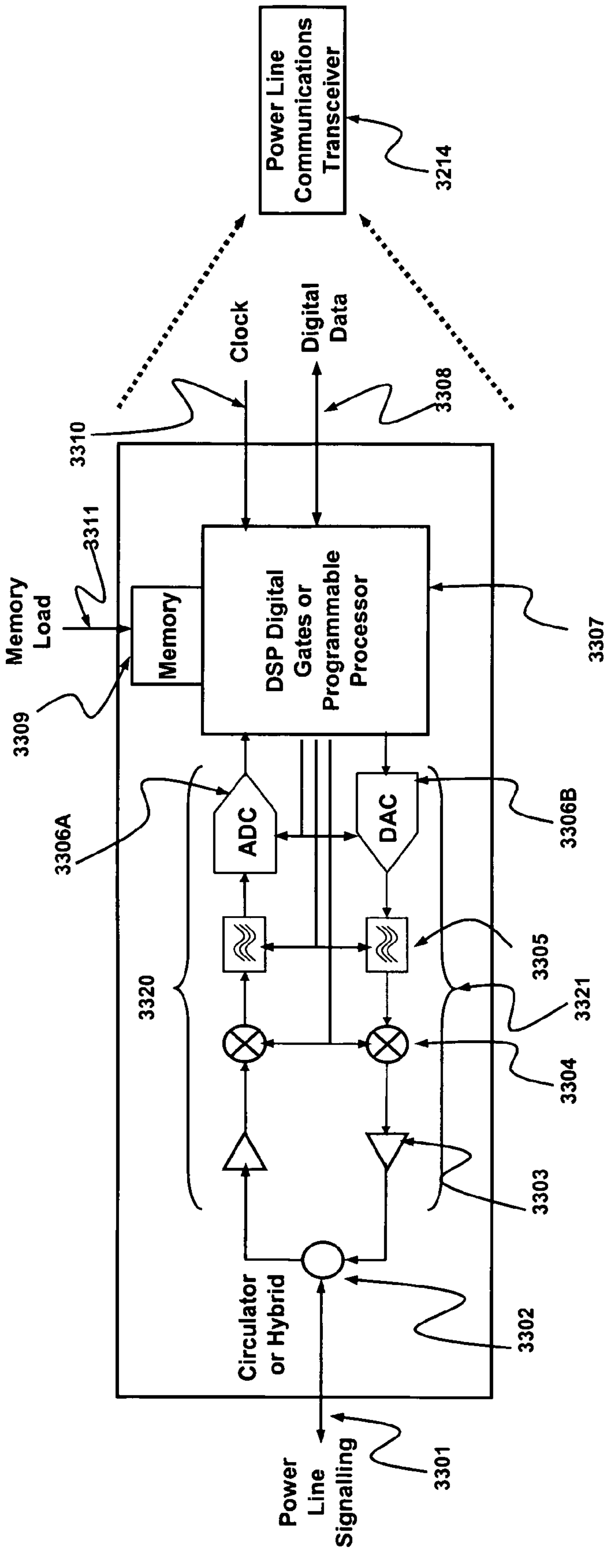

Figure 4 -Power Factor Control Method
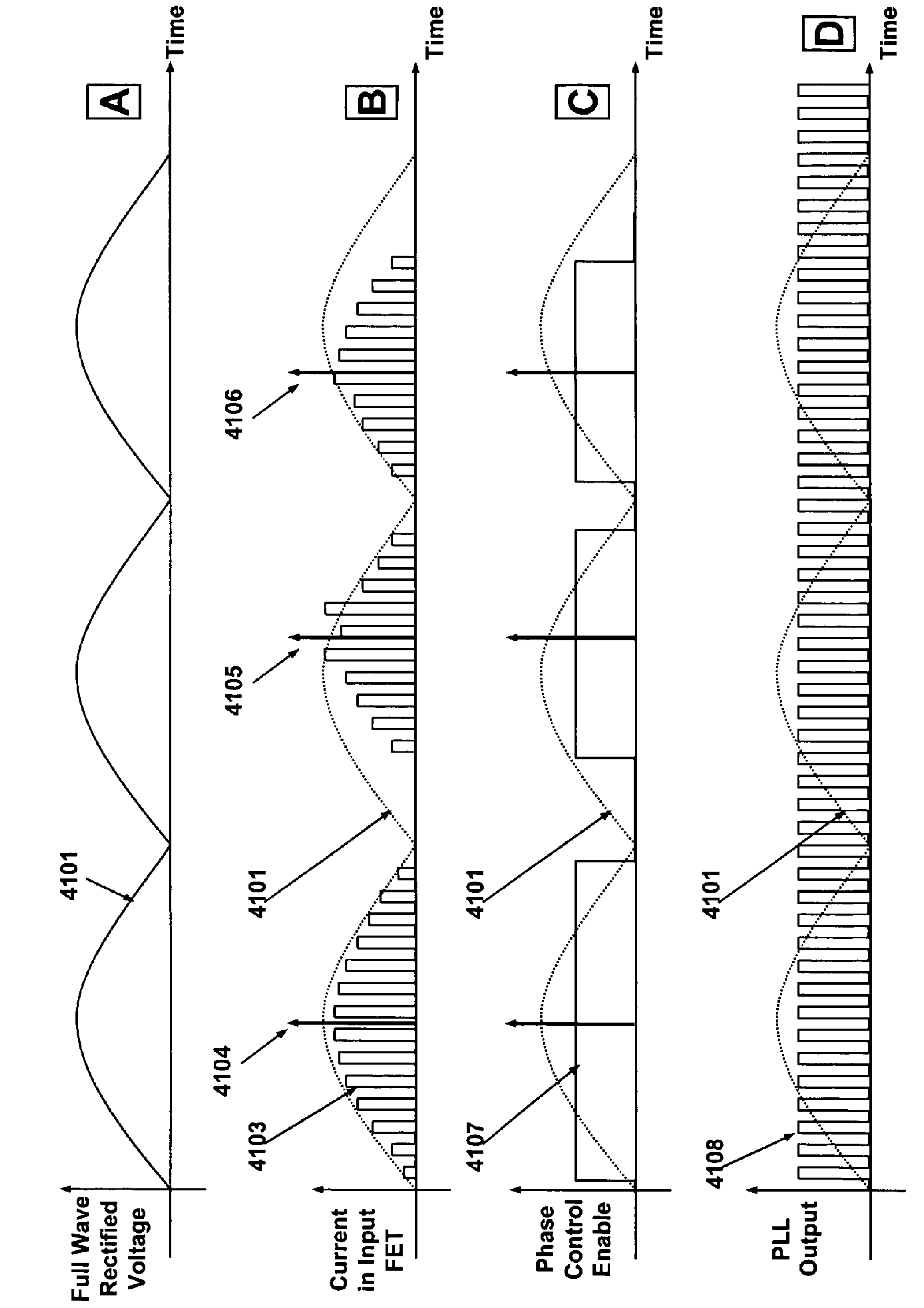

Figure 5 - Non-Harmonic Communication Method Showing 1 Gating Tone/Cycle
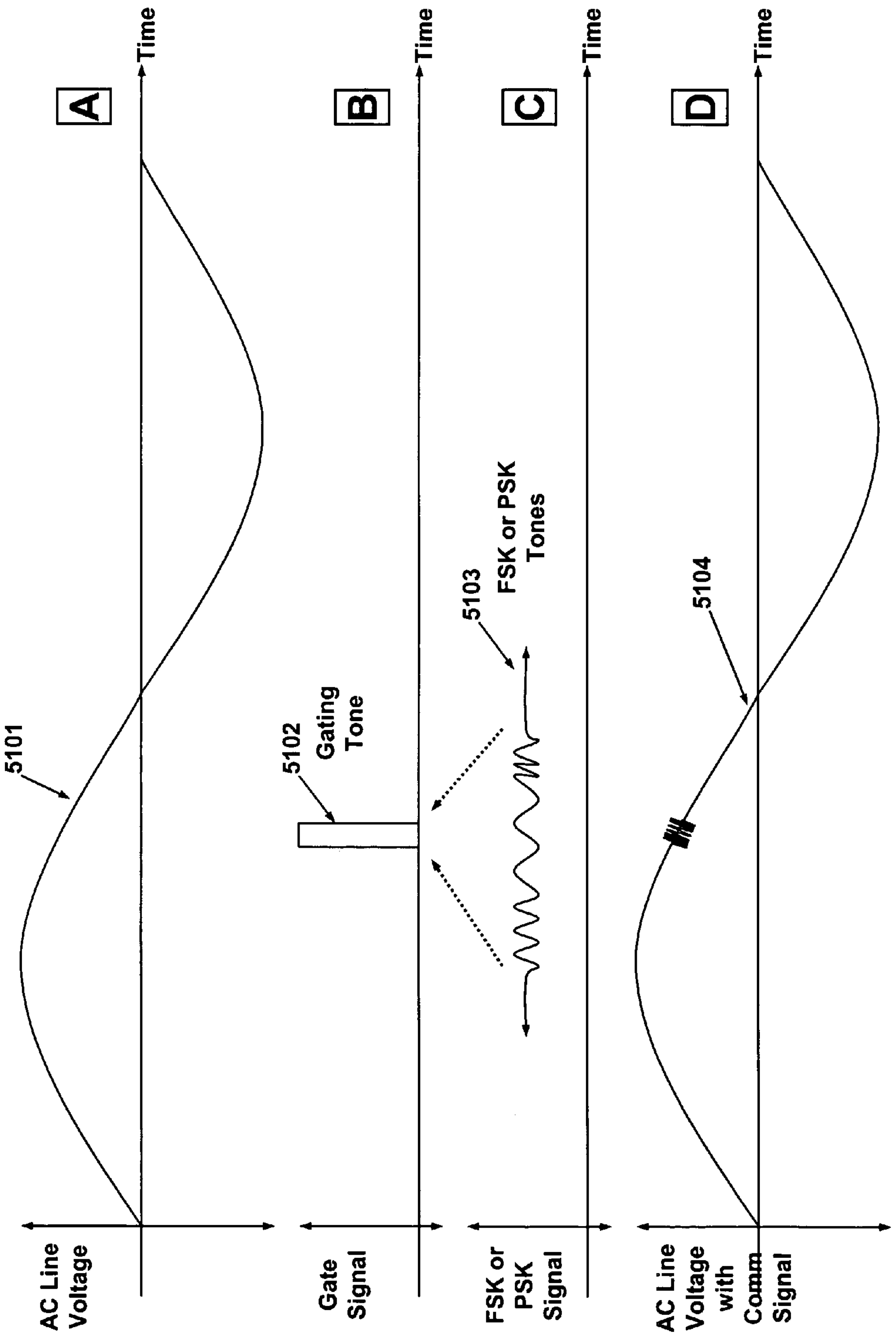

Figure 6 - Spectrum of Non-Harmonic Communication Method
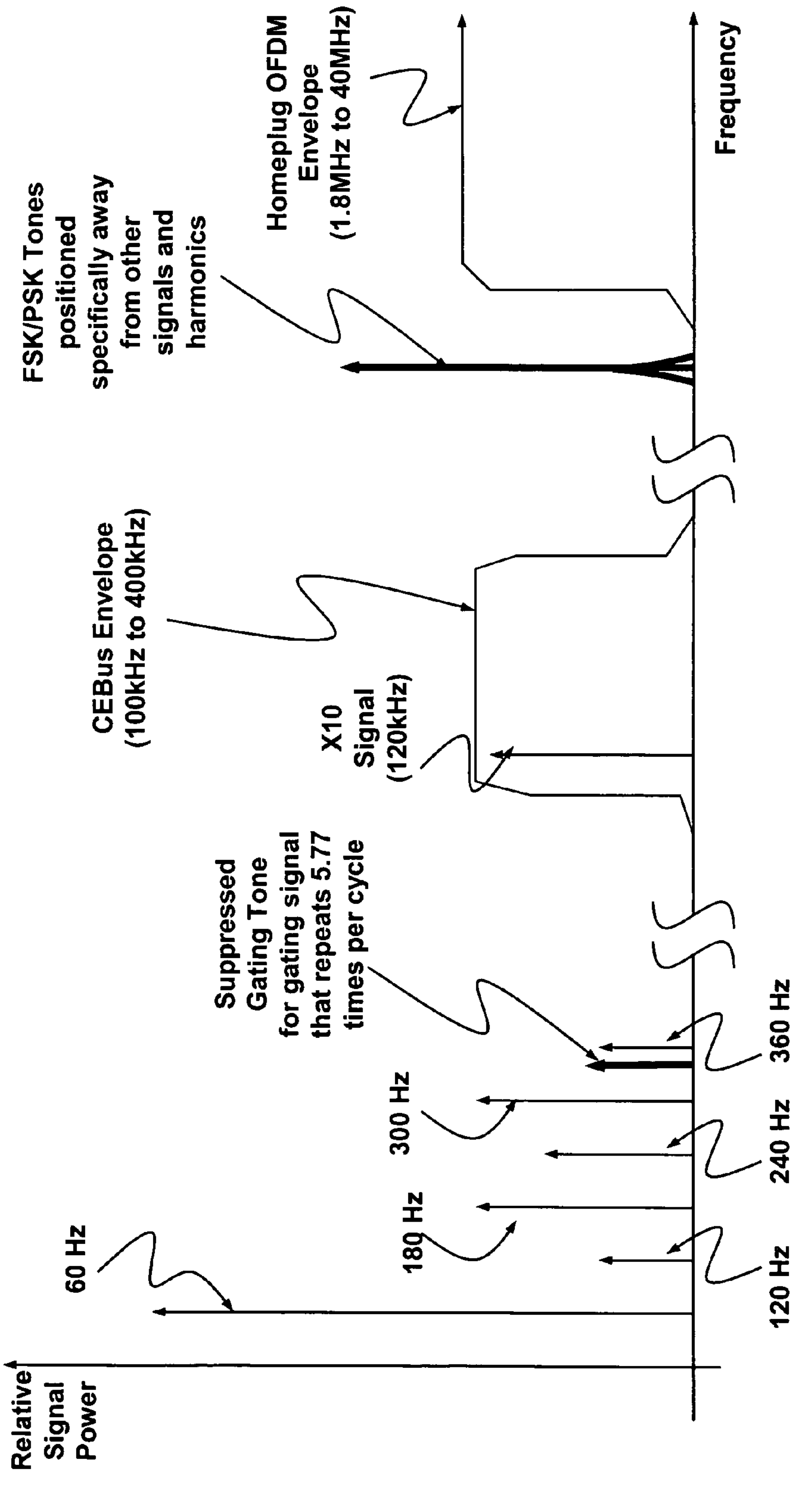

METHOD AND APPARATUS FOR USING LIGHTING TO PERFORM FACILITY-WIDE POWER FACTOR CORRECTION DIMMING AND REMOTE FUNCTIONS AND TO COMMUNICATE WITH A BUILDING CONTROL SYSTEM OVER A POWER LINE COMMUNICATIONS METHOD(S) WHICH CAN BE PROGRAMMED AFTER MANUFACTURE

CROSS REFERENCE TO RELATED APPLICATIONS

This application claims priority to U.S. Provisional Patent Application No. 60/696,024 filed on Jun. 30, 2005.

FIELD OF THE INVENTION

Invention pertains to a method, apparatus, and system for implementing facility wide power factor correction, canceling undesirable harmonics, remote functions and communication with a facility control system over power line communications.

BACKGROUND

Conventional power line communication systems and methods experience distortions and noise due to variations in power factor, undesirable harmonics, etc. when communicating with/to variable loads. Conventional ballast's are vulnerable to power-factor variations and undesirable harmonics. There is therefore a need for electronic ballast's that can communicate over a power line communications network and can perform facility wide power factor correction, harmonic distortion correction, dimming and remote functions depending upon the power factor status, harmonic distortion status, and varied load requirements in a facility.

SUMMARY

Electronic lighting ballast in a facility intentionally presents a non-unity power factor load to an inductive or capacitive power supply, such a capability being used to correct the power factor for a larger facility employing different types of loads for which power factor compensation is desirable. Electronic lighting ballast is also used to intentionally generate specified harmonics of a certain phase and amplitude to a power source, and further, the method, apparatus and system uses such a capability to cancel undesirable harmonics generated by other equipment in a larger facility employing different types of loads.

A method of employing a communications protocol between an electronic ballast with adjustable power factor, adjustable power consumption, or adjustable harmonic distortion characteristics, and a facility control or monitoring system which can be monitoring facility wide power factor, power consumption or distortion, such that the system can communicate with many such adjustable ballast's in a facility, and direct the ballast's, collectively or individually, to change their power factor or light output status or harmonic characteristics.

A method and apparatus for building electronic ballast such that the communications and ballast functions can be cost effectively integrated into low-voltage semiconductor integrated circuits. More specifically, the semiconductor integrated circuits which contain both low voltage timing, communications and control circuits as well as high voltages typical of a lighting ballast. Further, the semiconductor integrated circuits under which, aspects of the ballast and communication functions can be under the control of a microprocessor, also contained in a low voltage integrated ballast.

BRIEF DESCRIPTION OF THE DRAWINGS

FIG. 1 shows a system diagram of the use of electronic ballasts in a building that are able to communicate with a power monitoring system, which itself can either be manually controlled or automatically controlled or remotely controlled.

FIG. 2 shows a diagram of a typical ballast circuit employed in the lighting elements, 1101 and 1201, of FIG. 1.

FIGS. 3A, 3B and 3C shows a diagram of the elements inside the integrated controller, 2111, of FIG. 2.

FIG. 4 shows graphs of important currents and voltages in the apparatus of FIG. 4.

FIG. 5 shows characteristic waveforms of a building control communications method taught herein.

FIG. 6 shows a spectrum of the building control communications method.

DETAILED DESCRIPTION

A description of the various figures which teaches the system, architecture, method and apparatus of the new invention is described below.

FIG. 1 is a block diagram of a building system, 1401, where the building is fed primary power by mains power 1403, from the local power grid, represented by the power factor 1402. Also entering the building 1401, is a signal 1404, which can enter on a wired or wireless communications link, and which is explained further below. The building 1401, contains in this example, two floors, Floor A and Floor B. Hereafter the term floors is defined to include equally areas of a building, factory or other facility where with single or multiple load areas, regardless of whether such load areas represent different physical floors. The building further contains service entry switchgear 1304, which provides power distribution to various floors through power bus(es) represented by the heavy wire 1301. At the service entrance switch equipment, or optionally at each site, each floor or in each area of significant power usage, a power-factor monitoring device 1305 monitors the power factor, power consumption and/or harmonic distortion of the building or area of the building or site. Additionally, the power-factor-monitoring device is able to communicate the measured parameter, either by a wired or wireless communication link 1306, to building, area, and site or floor controller 1302. Typically the controller 1302 includes a monitoring and control function, which control function optionally includes a processor and display capability. The control function either automatically or with manual assistance monitors various functions in the building or area, such as power factor, power consumption, power line harmonic distortion, power conditions, alarm conditions, temperature, and other characteristics of the building or area which are relevant to maintaining the building's proper and/or safe and/or efficient operation. Of the many capabilities that exist on such controllers, which controllers are well known to those studied in the art of building control and security, a link 1307, which can be wired or wireless, is provided to ballast controller 1308. Ballast controller 1308 is configured to convert the communications that comes from controller 1302 into communications suitable for distribution to various floors which can be a different communications link or medium than that connected directly to the ballasts. On each floor or site or area served by a load center, the diagram shows arrays of lighting 1101, and 1201, which contain the ballasts, which ballasts' internal characteristics are further described below. Lights with ballasts 1101 and 1201, are wired in banks with wiring 1102 and 1202, and connected, optionally through switches 1106 and 1206, which can be wall switches or automated control switches to allow the lights 1101 and 1202, to be turned on or off. In one embodiment, the switch is typically replaced with a new switch that does not interrupt the power-line connection to the ballast. Instead, the said new switch causes a command to be sent to the ballast to turn itself on or off, allowing power to arrive at the ballast continuously, so that communications and other circuits that must remain functional in the ballast even when lighting is not desired can receive power. The wiring continues further into the load center 1103 and 1203, and into breakers 1104 and 1204, which themselves are wired to a supply bus 1301. The ballast communicator 1308, is shown communicating with the ballasts contained in lights 1101 and 1201, through both possible optional methods, including either a power line communications coupled to the power bus via coupling means 1309, which as shown is a capacitor but can be another suitable method well known to those skilled in the art of communications over power lines, or another communications link 1303, which can communicate over the link 1303 with repeater isolator circuitry 1105 and 1205, which repeater isolator circuitry is then wired into each circuit in a floor-by-floor or area-by-area manner, such that the communications coming from the ballast communicator 1308, is distributed to and from each ballast in each circuit 1102 and 1202. Not shown, but also not departing from the invention, the repeater isolators 1105 and 1205 can be installed as part of switches 1106 and 1206, instead of being installed in load center 1103 and 1203. Also, the repeaters 1105 and 1205 can be configured to convert the communications from the ballast communicator 1308 from one medium or method to a power-line-based method and medium before arriving at the ballasts. Furthermore, the repeater isolators 1105 and 1205, which as stated, can be placed in switches 1106 and 1206, can also optionally perform an isolation function such that the addresses of individual ballasts in various floors can be repeated. However, by use of the isolation function, a floor or isolated circuit must first be addressed in order that the isolator 1105 and 1205 open the communications channel between the ballast communicator 1308 and an individual ballast, a single part of 1201 or 1101.

Although a specific communications method is described further below, the communications protocol employed for the communication over link 1303 or 1301 via coupling circuits or assembly 1309 can be one or multiple types of communications links already established. Some of the established communication links in use are the IEEE802.11 wireless communications link, a so-called Home Phone Network Alliance (HPNA) protocol over a phone line or twisted pair, a so-called Home Power Line Network, an IEEE802.3 often called Ethernet link, a so-called X-10 link, etc. However, any other proprietary link that is able to communicate either uni-directionally or bi-directionally to the ballasts via isolator repeater 1205, or via a wireless or wired link, without departing from the scope of the system taught herein may be used. The requirement on the protocol in order that it work within the constraints of the system invention taught is that each ballast 1101 and 1201, be addressable individually or as a group. Further, it is essential that the repeater isolators 1105 and 1205 convert communications from the ballast communicator 1308 into a suitable power-line based communications method. This means that wiring or communications according to the method employed for 1303 or 1301 need not be carried to each of the ballasts 1101 and 1201, but rather use is made of power wiring.

Still referring to FIG. 1, the repeater isolators, 1105 and 1205, are installed in line with a series of ballasts 1101 and 1201, in either the load center 1103 and 1203, or with or in place of switches 1106 and 1206. The purpose of the isolator repeaters 1105 and 1205 is to isolate ballast chain signaling 1101 and 1201 from each other within a group and between floors. Isolation of ballast chain signaling is implemented such that a multitude of lighting ballasts with a total count beyond the address space of the protocol, can be communicated with/to by the ballast communicator assembly 1308. The ballast communicator assembly 1308 communicates first by addressing a repeater isolator, and next by addressing specific ballast connected to that specific repeater isolator. Further, the isolator repeaters allows the employ of a communications protocol and signaling method, which method alone is not capable of communicating reliably over a wide area or over lengthy power lines 1301 or other communications medium 1303, through the breakers 1104 and 1204, switches 1106 and 1206, and to ballasts 1101 and 1201, through wiring 1102 and 1202. While such systems, especially power-line communications systems, cannot typically communicate over lengthy and convoluted lines, and especially through switches 1106, they can successfully communicate in sections such as from the ballast controller 1308, to the isolator repeaters 1205 and 1105, and then subsequently from repeater isolators 1105 and 1205, to ballasts 1101 and 1201.

A further characteristic of the system and architecture of FIG. 1 is that each ballast 1101 and 1201, comprises a microprocessor and communications assembly such that each ballast can (a) execute a ballast control program loaded from the ballast controller 1308, and (b) be enabled to make decisions on the operation of the ballast including the light on or off state, on its own, when so enabled by the ballast controller 1308, and when taking into account environmental information that each said ballast can itself be capable of gathering. Thus, during certain periods of, for example, high local power consumption, the ballast controller 1308 can instruct all ballasts to decide each for themselves whether to stay lit, dim or turn off according to a severity index or threshold and according to the priority of the ballast or other apriori information programmed in the ballast, and according to environmental factors which each ballast can gather about its' vicinity. This results in some ballasts staying on at full brightness and other ballasts turning off light output altogether. For example, critical lighting in stair wells and entry ways can be instructed to never dim or turn off, while lighting in closets can be instructed to always turn off even at the lowest energy savings conditions that can be imposed in a building. Environmental information locally collected by a ballast microprocessor coupled to other sensors, a threshold for turn-on or turn-off, and a flow of possible decision making coupled with a programmed threshold, can be programmed into the microprocessor in the ballast in a manner known to those practiced in the art of processor programming. A flow can represent a logical examination of environmental conditions with respect to a threshold for each or a multitude of conditions as set by communications from a building control system, inclusive and exclusive, with some conditions optionally being logically ANDed or ORed. This method of distributed decision making has the advantage that it minimizes the necessary communication between the ballast controller 1308 and the ballasts. Additionally, such a method distributes the decision making process for power savings, so that the building control system is not required to make every decision for every ballast in a large installation. It has the further advantage over existing dimming systems in that the power saving is achieved by completely shutting off a ballast in many cases, thereby avoiding the deleterious power factor that is often so bad as to be uncorrectable, usually caused by electronic ballasts in a dimming state. Additionally, it has the advantage over existing locally controlled occupancy sensor installations as each ballast can itself be controlled to turn on or off, instead of the entire bank of ballasts on a single occupancy sensor. Further the conditions for turning on or off can be programmed over a power-line communications link so that the lighting on or off criteria can be adjusted according to other factors, such as the utility power load, unknown to the occupancy sensor.

Each of the ballasts 1101 and 1201, has a circuit as described in FIG. 2, the details of which are further described below. Referring to FIG. 2, a single integrated circuit package 2111, includes two integrated circuits 2111A and 2111B, the details of which are further described in FIG. 3. Still referring to FIG. 2, alternating current line input 2101 is wired through the full-wave rectifier including diodes 2103, out of which come two signals 2205 and 2201, which are referred to as the reference or system ground 2205, and the rectified AC line voltage 2201. The line input 2101 is also differentially coupled to the integrated circuit communication signals via coupling elements or circuits 2102. The coupling elements or circuits 2102, in this case shown as capacitors, can optionally be other suitable coupling elements, such as an isolated transformer, a transformer-capacitor combination, or an opto-isolator. The aforementioned coupling elements 2102 are used to couple the communication signals within integrated circuit 2111B to the communication medium, which in the embodiment shown is the power line wiring 2101. Signal 2201 is wired to a DC-DC converter including inductor 2104, diode 2105, switching device 2106, storage capacitor 2108, and control circuitry inside integrated circuit 2111. These elements are controlled in such a manner as described later below, such that signal 2206 has a constant DC value of a high enough voltage suitable to drive the ballast circuitry for a fluorescent or other type of lamp. Resistor 2107 in conjunction with capacitor 2109, and circuitry inside integrated circuit 2111 is used to create a regulated voltage suitable for powering the lower half 2111B of integrated circuit 2111 at the signal pin labeled Vdd, and is referenced to system ground 2205. Resistor 2112 and capacitor 2113 are likewise used with circuitry inside of the upper half 2111A of integrated circuit 2111 to create a second Vdd2 signal referenced to the REFP signal. Capacitor 2110 is used to couple an AC signal from the lower half 2111B to the upper half 2111A of integrated circuit 2111, such that no DC connection need be made and such that the lower half 2111B can signal the upper half 2111A, further described in FIG. 3. Capacitor 2110 can optionally be two capacitors to couple a differential AC signaling as indicated in 2110 Option A, or can be a transformer or an opto-isolator as indicated in 2110 Option B. Signal 2203 monitors the voltage across the switching device 2106 so that when the switching device 2106 is turned on, the signal 2203 can be monitored by the integrated circuit 2111 to discover the current in the switching device 2106. Without departing from the scope of the invention, a resistive element, shown in 2106 Option A, can be inserted in series with the switching device 2106 in order that the current's characteristic of traveling through the switching device 2106 when it is turned on by signal 2204, is suitably high to be detected and measured with signal 2203. The switching devices which are typically N-type FET or bipolar devices 2114 and 2120, and ballast elements 2115, 2116 and 2118 form a typical half-bridge ballast network, well known to those practiced in the art of ballast design, and drive lamp 2117 from the high voltage DC source created on DC supply signal 2206. Resistive elements 2121 and 2119 allow the monitoring of the currents in their respective legs in the ballast switching device and the lamp respectively, through measurement by signals FETSNS and LMPSNS respectively, which are measured by circuits inside the integrated circuit 2111B. Additional input/outputs shown as IN2 and IN1 to the integrated circuit can also be used to measure other inputs from sensors such as a temperature sensor, light sensors or occupancy sensors. The results of those measurements, as well as the measurements on FETSNS and LMPSNS can be communicated to a building control system through the communications circuitry inside integrated circuit 2111B, via coupling 2102 to the line 2101 and onto the system as described in FIG. 1. Alternatively, the IN1 and IN2 signals can be configured as outputs, in order to turn on or off separate devices or equipment that is optionally controlled from the ballast. Coupling element 2110 between signals labeled HCTLOUT and HCTLIN, while shown as a single ended coupling, can also be configured as a differential coupling through the use of an additional coupling element, shown in 2110 Option A or Option B, between additional suitable pins without departing from the scope of the invention disclosed herein.

The circuitry within the integrated circuit 2111 includes two major blocks, 2111A and 2111B which is described in FIGS. 3A and 3B respectively. Referring now to FIG. 3A, the upper part of the integrated circuit comprises a frequency discriminator circuit, which circuit receives singled-ended or differential signaling from the lower section of the circuit in FIG. 3B. This in order that the lower section of the circuit containing the microprocessor can signal the upper section without requiring a DC connection between the two. The Frequency Discriminator 3101 receives one or more frequency tones as input, and converts those tones into a respective number of logic signals 3106. These logic signals are referred to the local reference signal REFP of the upper section of the integrated circuit in FIG. 3A. Note also, that the frequency tones do not themselves have a DC component, and are intended to carry information, converted by the Frequency Discriminator, into logic signals. This frequency discriminator can be one of a number of types of frequency classifiers that are well known to those who are trained to design such integrated functions. In the event an opto-isolator is used for FIG. 2 2110 Option B, the frequency discriminator is not needed and the opto-isolator connection can directly enter the logic circuits. The upper section of the circuit shown as FIG. 3A has its own independent regulator 3104 with its own suitable voltage reference 3102 such that the circuit FIG. 3A can generate its own supply voltage from the high voltage DC supply of FIG. 2 2206 referenced to the REFP signal. The logic circuits 3103 are configured to signal various functions to the upper part of the circuit FIG. 3A such as calibrating or adjusting the voltage reference, calibrating or adjusting the regulator, or instructing the FET driver to turn on the upper switching device of FIG. 2 2114.

The switching device of FIG. 2 2114 is typically an N-type FET or Bipolar device, and takes a relatively low voltage to turn on. Since the upper circuit is isolated in a DC sense from the rest of the circuitry, communicating with the lower circuit FIG. 3B via the DC-blocking coupling device of FIG. 2 2110, the maximum voltage across any element in the upper circuit of FIG. 3A is equal to the maximum voltage required to drive the gate or base of the switching device of FIG. 2 2114 with respect to the signal REFP. Again, the REFP signal is typically on the order of 10V or less. Therefore the upper circuit of FIG. 3B does not have to be a high-voltage type of circuit, but instead can be a low-voltage type of circuit. In the event the switching device of FIG. 2 2114 causes the REFP signal to be pulled to the level of the DC high voltage supply of FIG. 2 2206, the capacitor of FIG. 2 2113 serves to maintain the Vdd2 supply of the upper circuit of FIG. 3A. This is usually during the transient period when the switching device 2114 of FIG. 2 is turned on. It is also possible to insert a diode in series with the resistor of FIG. 2 2112, as indicated in 2112 Option A, such that the resistor prevents discharge of the capacitor of FIG. 2 2113 when the Vdd2 signal exceeds the voltage of the DC supply of FIG. 2 2206. The lower part FIG. 3B corresponding to 2111B of the integrated circuit of FIG. 2 2111, is now explained. As with the upper circuit FIG. 3A, the lower circuit FIG. 3B does not need to be a high voltage type, as the largest voltage required across any of its circuit elements is the voltage required to drive the gate or base of the switching device of FIG. 2 2120 with respect to its source or emitter, which is connected to signal FETSNS in FIG. 2, and which is typically 10V or less. Referring to FIG. 3B, the lower circuit contains a voltage regulator 3201, and reference 3202, which supply power and bias to functional blocks as necessary and which are controlled by the microprocessor 3206 so that they can be calibrated or adjusted after manufacture, by the microprocessor. The lower circuit of FIG. 3B also contains a microprocessor 3206, an optional associated SRAM 3205, and an optional ROM 3207. The ROM 3207 can be of the one-time or re-programmable type, and can be eliminated if instructions for the microprocessor 3206 are read instead from SRAM 3205. Also, not shown is an assembly to load either memory 3205 or 3207 from an external memory, which is also possible and optional, without departing from the scope of the invention, and which is well known to those practiced in the art of microprocessor-to-memory interface design.

Referring again to FIG. 3B, the lower circuit 2111B also has a circuit for generating various frequency tones to signal HCTLOUT. These frequency tones can be single-ended or differential and can be gated by a gating circuit 3203, to turn the frequency tones on or off or to combine multiple tones onto the signal output HCTLOUT. The PLL or oscillator 3204 can be independent or part of the other PLL 3215, and is controlled either by logic not shown in this embodiment, or by microprocessor 3206. The upper circuit FIG. 3A logic block 3103 is caused to control the upper circuit 2111A in a manner desired by the control circuits of the lower circuit 2111B, when connecting via the coupling element of FIG. 2 2110. Also the lower circuit 2111B of FIG. 3B contains the input/outputs COM1 and COM2 which are coupled to the line frequency by coupling elements shown in FIG. 2 2102, and which are connected to both a comparator 3214 and a power line communications transceiver 3214. The purpose of the comparator 3214 is to provide clock generation PLL 3215 with a logic signal that corresponds to the un-rectified AC line frequency, so that it can be multiplied by the PLL 3215 into higher frequencies which are employed as described below. The power line communications transceiver 3214 can be of many types of circuits known to those practiced in the art of power line communications. Further, it can be a version of one of the known types, except that it is also optionally gated to be operative for either receive or transmit during certain periods of the AC voltage waveform. These periods are controlled by the PLL 3215, logic (not shown,) the microprocessor 3206, or some combination of the three.

The PLL 3215 is a clock multiplication type of PLL. Its output frequency is a multiple of many times the input frequency, and further can include an additional concatenated PLL in order to get sufficient multiplication's to provide useful frequencies for running the microprocessor. Optionally, the PLL can employ off-chip components (not shown) for a loop filter. Additionally, the PLL can employ fractional-N techniques, also not shown but well known to those practiced in the art of PLL design, where the output frequency of the PLL 3215 can be either an integer multiple of the input frequency or a non-integer multiple of the input frequency from comparator 3214. With continued reference to FIG. 3B, the lower circuit also contains a DC-DC control section including a sensing comparator 3215. The circuit further contains an adjustable reference 3216, which is controlled either by logic not shown in this embodiment or by the microprocessor 3206. Additionally, the circuit contains DC-DC control logic 3212 which implements a control function to cause the switching device of FIG. 2 2106 to be switched in such a manner that a high voltage DC supply is maintained across 2206 in FIG. 2. Further, the circuit is sensitive to the voltage on 2206 (FIG. 2) through direct measurement by a resistive ladder not shown in FIG. 2, but well known to those practiced in the art of DC-DC converter design. Alternatively, direct or indirect measurement via a measurement circuit such as an analog-to-digital converter can be read directly by the logic 3212 or can be examined via microprocessor 3206. The DC-DC control logic of 3212 is further configured to turn on and off the switching device of FIG. 2 2106, through the FET driver of FIG. 3B 3213, such that a boost-type DC-DC converter is built. It is also sensitive to the current under the switching means' control as indicated in FIG. 2 2202, such that the control logic 3212 in FIG. 3B or the microprocessor 3206 in FIG. 3B can control the maximum current in the switching device of FIG. 2 2106. The maximum current in the switching device can thus be controlled independently of the waveform of the full-wave rectified line voltage of FIG. 2 2201. Note also, that an additional resistor can be added in series with the switching device 2106 as indicated in 2106 Option A without departing from the scope of the invention.

Referring still to FIG. 3B, the lower circuit also contains ballast control logic 3209 which controls the desired switching of the switching device 2114 and 2120 (FIG. 2) via the signals TRIGN and INTTRIGP. Signal TRIGN drives switching device 2120 (FIG. 2) via FET driver 3208, and signal INTTRIGP causes the switching device 2114 (FIG. 2) to be actuated via the coupling of the frequency tone to the upper circuit FIG. 3A, eventually on to the TRIGP signal of FIG. 3A as previously described. The lower circuit FIG. 3B optionally contains single or multiple analog-to-digital converters 3211 configured to measure analog signals representing the switch element currents of FIG. 2 (2114 and 2120) via the signal FETSNS, lamp current via the signal LMPSNS, other undefined inputs IN1 and IN2 optionally connected to other sensors, and internal temperature sensor 3219. The inputs described, connected to the ADC 3211, can be read by logic (not shown in the figures) or by the microprocessor 3206. The microprocessor or logic are thus sensitive to the signals available on said inputs, which signals are used by the microprocessor or logic to configure the switching frequencies and characteristics of the ballast, to monitor various conditions of the ballast such as the lamp or/and switching device conditions, high voltage DC conditions, the temperature of the chip, etc. They are further used to configure the ballast to operate various different types of lamps under differing conditions, and to communicate information about the said inputs to the outside world via the communications network described in FIG. 1 through the communications link of FIG. 3B 3214. Still referring to FIG. 3B, and not shown in this embodiment but also possible are optional additional comparators that can be employed to directly monitor other conditions in the ballast side or DC-DC converter side. These comparators supply direct logic signals about conditions of the state of the external circuitry shown in FIG. 2, or the signals in FIG. 2, directly to logic or the microprocessor in either or both FIGS. 3A and 3B. For example, a comparator with one input tied to a resistor tree between the high voltage DC supply of FIG. 2 2206 and the ground 2205, and the other input tied to a reference can be used by the DC-DC control logic of FIG. 3B 3212 to sense the DC high voltage supply, without departing from the scope of the invention. Furthermore, the output of the PLL, 3217, can be routed to various circuits as needed (not shown,) or controlled by logic (not shown) or the microprocessor as indicated without departing from the scope of the invention.

Now referring to FIG. 3C, the preferred embodiment of the power-line communications system is explained. Although one embodiment teaches a new power line communication system further below, in certain situations it is desirable to retrofit an embodiment of the invention into a building or situation in which the power-line communications methods have been previously established. Also, it may be further desirable to adapt the ballast in the field to a pre-established communications scheme. In order to enable the practice of either the new invention for power line communications or an older existing method, the architecture and apparatus of FIG. 3C is the preferred method. It is understood that departures from the diagram of FIG. 3C can be made without departing from the teaching of FIG. 3C. FIG. 3C depicts a generalized DSP-based architecture which can be integrated in an electronic ballast, and which is further capable of transmitting and receiving many different power-line communications protocols. Signals, which can be differential in implementation but shown with only one line 3301 for convenience, enter and exit the Power Line Communications Block, 3214, and optionally enter a circulator or hybrid 3302, which circulator or hybrid separates outgoing signals and incoming signals to be further processed by a receive path 3320 and a transmit path 3321. Along each path, similar functions are enumerated, with the signal direction appropriate to either transmit or receive. An amplifier 3203 amplifies incoming signals for the receive chain, and outgoing signals for the transmit chain and is optionally controllable for gain, which such control is not shown for clarity. Optionally, a phase adjustment block 3204 is included to assist in calibrating a reference phase for the signals through a feedback loop created by the DSP Processor 3207 and the clock controlling the DSP processor 3210. Next, an optional programmable analog filter 3305 exists in the receive path to eliminate unwanted signals from overloading the receive ADC 3306A and in the transmit path to eliminate out-of-band signals and harmonics generated by the DAC 3306B. In the receive path is an analog-to-digital converter, ADC, 3306A which is typically 8 or 10 bits, but can be more bits or fewer bits without departing from the scope of the invention. In the transmit path is a corresponding digital-to-analog converter, DAC, 3306B, which is also typically 8 or 10 bits, but can be more or less bits without departing from the scope of the invention. Both ADC and DAC connect to a programmable logic or DSP processor block 3307, which optionally has instruction or program memory, 3309, which such memory can be optionally programmable and can be optionally loaded after manufacture via external memory interface 3311. The DSP processor block 3307 takes in a clock 3310 to drive the logic and other functions described above as well as necessary ancillary control signals, biases and references not shown, and provides digital data 3308 in a form suitable for use elsewhere in the ballast, and as described further in this disclosure.

It is apparent to those practiced in the art of digital signal processing that a relatively modest DSP processor block 3307 in conjunction with the circuits described is capable of performing most of the known narrow-band non-OFDM-based power line communication methods currently in use at the time of this invention. The use of small feature sized integration technology, enabled by the use of lower voltage integrated circuits in the electronic ballast as previously described, makes practical the inclusion of the circuitry represented in FIG. 3C. Such circuitry has the advantage of enabling the ballast to be retrofitted into buildings and situations with already existing power line communications methods, but with minimal effort and with no differentiation in the construction of the ballast and communications hardware at the time of manufacture. The elements, circuits and methods, described in FIGS. 2, 3A and 3B can be employed to cause dimming of a lamp in a manner well known to those practiced in the art of employing half-bridge ballasts to perform dimming, and is not specifically re-taught here. However, the elements, circuitry and methods described in FIGS. 2, 3A and 3B can be employed to also adjust power factor and harmonic distortion in a manner which is now described in conjunction with FIG. 4 as follows. Referring to FIG. 4, Waveform A 4101 is the full wave rectified voltage found in FIG. 2 2201, and is superimposed on all graphs in FIG. 4 for time reference. Waveform D 4108 shows the signal from FIG. 3B 3217, which is shown for clarity to be less multiplied than it can be in a typical application. This signal is used by the DC-DC control logic 3212 of FIG. 3B and microprocessor 3206 to create internal signal shown in FIG. 4 Waveform C 4107, through counters or other logic circuits well known to those practiced in the generation of timing signals with respect to a clock and a reference phase of the Waveform A, turned into logic by comparator 3214 in FIG. 3B. The envelope created by Waveform C 4107 is used in conjunction with the current limiting function enabled by comparator 3215 in FIG. 3B to cause the DCCTRL signal in FIG. 3B to turn on and off the switching device of FIG. 2 2106 so that the current in the switching device of FIG. 2 2202 is approximately that shown in Waveform B 4103 of FIG. 4. This is possible because the microprocessor and control logic in FIG. 3B 3206 and 3212 respectively run at many times the fundamental line frequency and have adequate time to cause the waveform required at DCCTRL in FIGS. 2 and 3B to cause the current Waveform B in FIG. 4.

Referring to Waveform B in FIG. 4, it is evident through the timing circuits described above that the average current envelope of the pulsed current of 4103 can be made to be sinusoidal in shape or correspond with the voltage waveform 4101 even if it is not sinusoidal. Further, the peak of the waveform can be made to line up with the peak of the voltage waveform 4101, as indicated by vector 4104, or can be made to lead or lag the voltage peak, as indicated in 4105 and 4106. This indicates that the power factor of the ballast is made to be a leading or lagging power factor. Furthermore, since the current pulses of Waveform B 4103 can be made to occur at specific times and with specific maximums through adjustment of the comparator reference 3216 of FIG. 3B rapidly by microprocessor 3206, the envelope of Waveform B 4103 can be made non-sinusoidal, and thus contain harmonics of the fundamental sinusoid which such harmonics are directly under control of the microprocessor. The microprocessor also has the constraint that the integral of the waveform 4103 times voltage waveform 4101 must supply enough power to the ballast to power the lamp at constant output regardless of the position of vectors 4104, 4105 and 4106 in a steady-state condition. However, that requirement is easily met by varying the peaks of the currents in Waveform 4103 during times of unity, leading or lagging power factor, even though the maximum peaks are shown relatively constant in Waveform B of FIG. 4 for clarity. Furthermore, a pseudo-random variation in the peaks of the current pulses for a given average current vector position can be created by logic or a microprocessor in order to reduce the harmonic content of the voltage or current in the supply lines to the ballast, caused by the ballast itself. Note that such variation changes from cycle to cycle in the sine voltage waveform 4101. Furthermore, the variation in the peaks of the current pulses can also be purposefully made across one or numerous ballasts to cancel harmonic distortion created by other equipment employing the same main AC supply, FIG. 1 1301.

The ballast can thus be programmed from a control or monitoring facility in a building or area via the communications architecture and methods already described. The ballast is programmed over the power line, to create either a power factor or a harmonic distortion that purposely counters a different power factor or different harmonic distortion created elsewhere in the building and/or to create a reduced harmonic distortion or a unity power factor. Thus building wide power factor or harmonic distortion is corrected through the use of one or multiple programmable ballasts acting in unison, and with respect to the frequency of AC line voltage, which serves as a reference for ballasts and communications. The programming of power factor and harmonic distortion correction in one or multiple ballasts over the power line is in addition to the other capabilities described above, where ballasts can individually or collectively communicate other information about ballast current, temperature, lamp current and temperature and age or other conditions of the ballast or lamp or other conditions associated with other sensors that can be connected to the ballast spare inputs IN1 and IN2 in FIG. 2 for sensing.

Of the many types of power-line communication methods that can be employed between the ballast in FIG. 3B 3214 and FIG. 1 1308, a particular method which makes use of the ability of the PLL 3215 in FIG. 3B to produce non-integral and therefore non-harmonically related timing signals is described. One of the problems of many low-rate power line communications protocols is that harmonic distortion or zero-crossing distortion causes sufficient interference to make the power line communications unintelligible over even modest distances. This is because the simpler systems, which are economically inexpensive enough to be suitable for mass deployment in ballasts, often make use of simple, harmonically related timing either in the frequency domain or in the time domain or both. These systems are thus subject to interference from other equipment that generates harmonic interference on the power line. In the disclosed invention, the lower circuit of FIG. 3B contains a PLL 3215 and logic within the communications transceiver 3214. This logic can generate timing signals, which are not harmonically related to the power line frequency. It is thus possible with the new methods and apparatus shown to generate the signals shown in FIG. 5. These signals can avoid interference with both harmonic content on the power line and other communications on the power line, such as OFDM or other methods commonly used by high-speed power line networks such as the Homeplug standard. Referring to FIG. 5, waveform A 5101 shows the undisturbed line voltage waveform present in FIG. 2 2101 or in FIG. 1 1102 and 1202. A timing signal 5102 is generated, which signal is directly or divided from the PLL of FIG. 3 3215 and which signal has no integral relationship to the line frequency. The signal 5102 is used to gate a higher frequency signal 5103, which is an FSK or PSK type of signal representing digital bits for communications, onto the power line during the time the signal 5102 enables it. Although timing signal 5102 is not harmonically related to the line frequency, and can therefore be made to occur during a specific repetitive period, or at a frequency where harmonic interference from other loads on the line are minimal, it further can be related in absolute time to the zero crossing of the line frequency waveform by comparator 3214 in FIG. 3A. Therefore, other devices and communications apparatus, such as that of FIG. 1 1308, can determine the appropriate time to observe and synchronize with the appearance of the communications FSK or PSK signal on the power line, thereby minimizing possible interference to power line communications from harmonic distortions created by loads on the power line. The type of power line signaling described above is of a type that is momentary in time and both the gating signal of 5102 and the FSK or PSK signal 5103 can be specifically designed to be easily detectable and also avoid both harmonics of the power line fundamental frequency as well as other frequencies on the power line such as those employed by a higher rate communications medium intended for data and not building control. An example spectrum that can exist on the power line 1301 is indicated in FIG. 6, which shows that the spectral lines created by the ballast communications that are specifically enabled by one embodiment of the system, architecture, apparatus and circuits disclosed herein can be placed as indicated.

ADDITIONAL EMBODIMENTS

In one embodiment, a communication system is integral to a ballast controller for communication over power lines. The communication system includes what is principally shown in FIG. 3C, and is adaptable to a non wide-band OFDM signaling method that can be used over a power line by means of programming the DSP processor to accommodate the power line signaling method used by a building or other facility. The DSP processor can be programmed on the field, after manufacture, or optionally, at the time of manufacture.

An alternate embodiment makes use of PLL locked to line frequency to implement a DC-DC converter and ballast lamp driver. The multiplication chosen for the PLL and the processor control can be employed to adjust the switching frequency of the DC-DC converter and/or the ballast so that the converter and ballast do not generate switching harmonics that interfere with RF communications equipment, either nearby in physical space, or in the RF spectrum. Further, the PLL described in the embodiments can be a dual PLL of two concatenated PLLs, where the first performs multiplication: only, and the second input to the second PLL can have a divider on its input in addition to a multiplier. Alternatively, the PLL described in the embodiments can be a fractional-N type PLL so its output frequency and therefore switching frequency is not harmonically related to the line frequency. Therefore specific pulses during which communications can be initiated is less subject to interference from harmonics on the power line. Alternatively or/and additionally, burst phase, frequency modulated, or FSK low-rate communications may be used over a power-line. These communications are implemented over a power line during a period of time in an AC line waveform, as timed by the PLL, where the burst is presented on the line during a non-harmonically related time. Thus it is less subject to interference and further does not interfere with other communications occurring over the power-line.

In another embodiment, a ballast makes use of a microprocessor to control and calibrate various circuits that make up the ballast. This increases yield and reduces requirements for accuracy at the time of ballast circuit manufacture. Also, this enables programmability for different lamp types or other response functions, for example, occupancy detection and turn off of lights, so that devices that do not meet calibration requirements need not be thrown away. Microprocessor and communications are also used to control the ballast so that a single integrated ballast chip design can simultaneously drive multiple types of lamps, communicate to/from other systems over the power line, and load a new ballast operating program over the power line. Yet again, the ballast can have controllable harmonic content (conducted or radiated), made either by manufacture, by later programming or via instruction received over a communications link to adjust for avoiding interference with other RF communications in the vicinity or powered on the same line. Further, non-harmonic or harmonically corrective currents can be generated in a ballast by varying the current in the DC-DC converter switch from cycle-to-cycle under control of a logic circuit or microprocessor as described. A logic circuit or microprocessor can be further used to generate a pseudo-random sequence for controlling the switching devices in a ballast DC-DC converter. Yet another embodiment employs a comparator in ballast design across either a resistor in series with or at the drain (collector) of a source-grounded MOSFET (emitter grounded-bipolar transistor) device. The comparator measures the current in the MOSFET and shuts off the MOSFET when the current reaches a specific set value. A processor or logic can change this set value over time to effect PF adjustment of the DC-DC converter.

Other variations and embodiments are possible in light of above teachings, and it is thus intended that the scope of invention not be limited by this Detailed Description, but rather by Claims following.

What is claimed is:

1. A system for using lighting to perform facility-wide power factor correction, dimming and remote functions, harmonic distortion correction, and communication with a building control system over a power line communications line, said system comprising:

electronic lighting ballast in a facility wherein electronic lighting ballast intentionally presents a non-unity power factor load to an inductive or capacitive power supply, such a capability being used to correct the power factor for a larger facility employing different types of loads for which power factor compensation is desirable;

power monitoring, distribution and controlling means;

power-line communication link between the said electronic ballasts and said controlling means;

second wired or wireless communication link;

repeater isolator circuitry between the said controlling means and electronic ballasts; and site or floor controller.

2. Electronic lighting ballast of claim 1 wherein the electronic lighting ballast is used to intentionally generate specified harmonics of a certain phase and amplitude to a power source, and uses such a capability to cancel undesirable harmonics generated by other equipment in a larger facility employing different types of loads.

3. Electronic lighting ballast of claim 1 wherein electronic lighting ballast further comprises adjustable power factor, adjustable power consumption, or/and adjustable harmonic distortion characteristics.

4. The system of claim 1 wherein the system further comprises facility control or monitoring capabilities which monitor facility wide power factor, power consumption or/and distortion, such that the system can communicate with many adjustable electronic lighting ballasts, and direct the ballasts, collectively or individually, to change their power factor or light output status or harmonic characteristics.

5. The electronic lighting ballast of claim 1 wherein the switching frequency of the ballast is controlled by a PLL or other device such that the switching frequency or its harmonics do not interfere with nearby or integrated communications systems either on the power line or RF communications nearby either in physical space or in the RF spectrum.

6. The ballast of claim 1 wherein the ballast makes use of a microprocessor to control and calibrate various circuits that make up the ballast in order to increase yield and requirements for accuracy at the time of the ballast circuit manufacture, also to be programmable for different lamp types and other response functions.

7. The electronic lighting ballast of claim 1 further comprising a DC-DC converter, and a comparator across either a resistor in serious with or at the drain (collector) of a source grounded MOSFET (emitter grounded bipolar transistor) device in order to measure the current in the MOSFET and operate the comparator to shutoff the MOSFET when the current reaches a specific set value, which value can be programmed by a processor or logic to effect PF adjustment of the DC-DC converter.

8. The electronic lighting ballast of claim 1 wherein the ballast has controllable harmonic content, incorporated either by manufacture, by later programming, or via instruction received over a communication link/line so that the harmonics are adjusted to avoid interfering with other RF communications either in the vicinity or powered on the same line.

9. The system of claim 1 further comprising a building control system loop wherein monitoring devices monitor one or more of power factor, power consumption, and harmonic content and then instruct one or more ballast's accordingly to compensate for the same.

10. The communications system of claim 1 wherein the communications system is a hybrid of non-power line communications to each floor or load area of a building or facility, which non-power line communications is then converted through the repeater isolator to a power line based communication, sent to a ballast bank.

11. The system of claim 1 wherein the electronic lighting ballast circuit further comprises a device that isolates and repeats a power line communications signal and also serves to provide instructions over the power line to a ballast to turn on or off instead of simply interrupting power to the ballast chain.

12. The system of claim 1 wherein the electronic lighting ballast is programmed from a remote location to execute a power savings program based on the severity of the power conditions, and the ballast then selectively turns itself on or off based on an evaluation of environmental conditions local to the ballast, by a microprocessor and an associated program.

13. The associated program of claim 12 wherein the associated program is created as per user requirements to control a ballast and to regulate a ballast shutoff condition higher or lower.

14. The environmental conditions of claim 12 wherein the environmental conditions comprise at least one of ambient temperature, time, and occupancy.

15. The system of claim 1 wherein the communication means is integral to the ballast controller for communications over the power line and is adaptable to non wide-band OFDM signaling method used over a power line by means of programming a DSP processor to accommodate a power line signaling method used by a building or other facility.

16. The programming facility of claim 15 wherein the programming facility is possible after manufacture of the system.

17. The programming facility of claim 15 wherein the programming facility is done at the time of manufacture.

18. The system of claim 1 wherein the power monitoring means further comprises a power factor monitoring device, wherein the said power factor monitoring device monitors at least one of power factor, power consumption, and harmonic distortion.

19. The power factor monitoring device of claim 18 wherein the power factor monitoring device communicates at least one of the monitored power factor, power consumption, and harmonic distortion via a communication link to the controlling means.

20. The communication link of claim 19 wherein the communication link is a wired communication link.

21. The communication link of claim 19 wherein the communication link is a wireless communication link.

22. The controlling means of claim 19 wherein the controlling means communicates via a link, with a ballast controller, which ballast controller converts the communications that comes from said controlling means into communications suitable for distribution to various floors.

23. The controlling means of claim 1 wherein the controlling means comprise at least one of a building, area, and site or floor controller.

24. The controlling means of claim 1 wherein the controlling means comprises a processor and display capability.

25. The controlling means of claim 24 wherein the said processor and display capability monitors various functions, which various functions comprise at least one of power factor, power consumption, power line harmonic distortion, power conditions, alarm conditions, temperature, and other characteristics which are relevant to maintaining proper and/or safe and/or efficient operation.

26. The distribution means of claim 1 further comprising service entry switch gear which provides power distribution through power buses.

27. The system of claim 1 wherein the repeater isolator circuitry is wired into each circuit in a floor-by-floor or area-by-area manner, such that the communications coming from the controlling means is distributed by said repeater isolator circuitry to and from all ballasts connected to the repeater isolator in said floor or area.

28. The controlling means of claim 27 wherein the controlling means comprises a ballast communicator.

29. The system of claim 1 wherein the repeater isolator circuitry is configured to convert communications from a ballast communicator from one medium or method to a power-line-based method and medium before arriving at the ballasts.

30. The system of claim 1 wherein electronic lighting ballast comprises a single or plurality of ballast banks.

31. Electronic lighting ballast bank comprising:

a plurality of ballasts wherein each ballast comprises a microprocessor based control and communications integrated circuit;

wherein the control and communications integrated circuit is partitioned into a lower and upper integrated circuit and further comprises a coupling element used to couple an AC signal from the lower half of the integrated circuit to the upper half of the integrated circuit, such that no DC connection need be made and such that the lower half of the integrated circuit can signal the upper half of the integrated circuit; and wherein each ballast can execute a ballast control program loaded from a ballast controller, and be enabled to make decisions on the operation of the said ballast.

32. The lower integrated circuit of claim 31 comprising integrated circuit communication signals, a voltage signal, a ground signal, switch current and lamp current monitoring signals, additional input/output signals, a frequency tone output signal, switching control signals, a DC voltage sensing signal, and a DC control signal.

33. The lower integrated circuit of claim 31, further comprising an AND gate, a PLL or Oscillator circuit, another PLL circuit, a power line communications transceiver circuit, a DC-DC control logic circuit, a reference circuit, a FET driver circuit, an SRAM memory, a ROM memory, a microprocessor circuit, a ballast control logic circuit, an analog to digital converter, another FET driver, a voltage reference, and a shunt regulator.

34. The lower integrated circuit of claim 33 wherein various frequency tones generated by the PLL or Oscillator and the ballast control logic are gated by the AND gate to turn the frequency tones on or off to combine multiple tones onto a single output HCTLOUT, which in turn is coupled to an input signal to control an upper circuit.

35. The circuit of claim 34 wherein the microprocessor communicates with the circuit to configure the switching frequencies and characteristics of the ballast to monitor various conditions of the ballast such as a lamp condition, a switching device condition, a high voltage DC condition, the temperature of a chip, and to configure the ballast to operate various different types of lamps under differing conditions and to communicate information about the inputs via a communications network.

36. The DC-DC control logic circuit of claim 8 comprising a DC-DC control section which comprises a sensing comparator, an adjustable reference controlled by a microprocessor, and DC-DC control logic which implements a control function to cause a switching device to be switched in such a manner as to maintain a high voltage DC supply on the line of the switching device, and which switching device is sensitive to the voltage on the line through either direct or indirect measurement via a measurement circuit such as an analog to digital converter.

37. The DC-DC control logic of claim 33 wherein the DC-DC control logic controls a switching device through an FET driver so as to form a boost type DC-DC converter.

38. The ballast control logic of claim 33 wherein the ballast control logic drives signals through a FET driver and through coupling with an upper circuit to control desired switching of a switching device.

39. The analog digital converter of claim 33 wherein the analog digital converter is configured to measure analog signals representing at least one of switch element current, lamp current, temperature, and other user defined inputs, which are connected to other sensors.

40. The power line communications transceiver of claim 33 further comprising:

digital signal processor (DSP) architecture based programmable processor;

a programmable memory;

an analog to digital converter (ADC);

a digital to analog converter (DAC);

a receive amplifier;

a transmit amplifier;

a receive and transmit phase adjustment block;

a circulator or hybrid for separation of receive and transmit signals;

a clock for control of the processor;

an optional programmable analog filter;

a receive path; and a transmit path.

41. The PLL of claim 33 wherein the PLL is a dual PLL of two concatenated PLLs, where the first PLL performs multiplication only, and the second input to the second PLL has a divider on its input in addition to a multiplier.

42. The PLL of claim 33 wherein the PLL is a fractional N-type PLL such that its output frequency and therefore its switching frequency is not harmonically related to a line frequency, thereby reducing the chances that specific pulses during which communications are initiated would be subject to interference from harmonics on a power line.

43. The circuit of claim 33 wherein the logic or microprocessor generates a pseudo-random sequence to control the switching devices in the DC-DC converter or in a lamp oscillating section, or both in order to reduce the harmonics generated in the voltage or current waveforms in the supply of a ballast or radiated by a ballast.

44. The DC-DC converter of claim 43 wherein an electronic lighting ballast generates non-harmonic or harmonically corrective currents by varying the current in the DC-DC converter switch from cycle to cycle under control of a logic circuit or microprocessor.

45. The lower integrated circuit of claim 31 further comprising input/output signals coupled to the line frequency with coupling elements, connected to a comparator and a power line communications transceiver, wherein the comparator provides a clock generation PLL with a logic signal that corresponds to an unrectified AC line frequency so that it can be multiplied by the PLL into higher frequencies.

46. The lower integrated circuit of claim 31 further comprising a power line communications transceiver, gated to be operative for both receive and transmit during certain periods of an AC voltage waveform and which such periods can be controlled by a PLL, control logic, a microprocessor, or a combination of either or all of them.

47. The upper circuit of claim 31 further comprising a frequency tone input signal, a voltage signal, a reference signal, and a switching device control signal.

48. A method for using lighting to perform facility-wide power factor correction, dimming and remote functions, harmonic distortion correction, and communication with a building control system over a power line communications line, wherein:

electronic lighting ballast in a facility intentionally presents a non-unity power factor load to an inductive or capacitive power supply, such a capability being used to correct the power factor for a larger facility employing different types of loads for which power factor compensation is desirable.

49. The method of claim 48 wherein the electronic lighting ballast is used to intentionally generate specified harmonics of a certain phase and amplitude to a power source, and uses such a capability to cancel undesirable harmonics generated by other equipment in a larger facility employing different types of loads.

50. The method of claim 48 further comprising using a burst phase, frequency modulated, or FSK low-rate communications over the power line during a period of time in an AC line waveform, as timed by a PLL, such that the burst is presented on the power line during a non-harmonically related time so that it is less subject to interference.

51. The method of claim 50 further comprising presenting the burst on a line such that it does not interfere with other communications that can be occurring over the power line.

52. A method of employing a communications protocol between an electronic ballast with adjustable power factor, adjustable power consumption, or adjustable harmonic distortion characteristics, and a facility control or monitoring system which can be monitoring facility wide power factor, power consumption or distortion, such that the system can communicate with many such adjustable ballasts in a facility, and direct the ballasts, collectively or individually, to change their power factor or light output status or harmonic characteristics.

53. The method of claim 52 further comprising building electronic ballast such that communications and ballast functions can be cost effectively integrated into low-voltage semiconductor integrated circuits.

54. The method of claim 53 further comprising semiconductor integrated circuits which contain both low voltage timing, communications and control circuits as well as high voltages.

55. The method of claim 53 further comprising semiconductor integrated circuits under which, aspects of a ballast and communication function can be controlled by a microprocessor, also contained in a low voltage integrated ballast.

* * * * *